United States Patent
Cox et al.

(10) Patent No.: US 7,630,835 B2
(45) Date of Patent: Dec. 8, 2009

(54) TERAHERTZ SENSOR TO MEASURE HUMIDITY AND WATER VAPOR

(75) Inventors: James A. Cox, New Brighton, MN (US); Christopher J. Zins, Coon Rapids, MN (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 11/930,517

(22) Filed: Oct. 31, 2007

(65) Prior Publication Data

US 2009/0107214 A1    Apr. 30, 2009

(51) Int. Cl.
*G01J 5/00* (2006.01)
*G06F 17/40* (2006.01)

(52) U.S. Cl. .............. 702/2; 702/23; 702/24; 702/134; 250/341.1; 250/340

(58) Field of Classification Search ............ 702/2, 702/23, 24, 134
See application file for complete search history.

(56) References Cited

U.S. PATENT DOCUMENTS

| 6,073,480 A | * | 6/2000 | Gokhfeld | 73/29.02 |
| 2007/0146720 A1 | * | 6/2007 | Cox et al. | 356/451 |
| 2007/0278407 A1 | * | 12/2007 | Wood et al. | 250/341.1 |

* cited by examiner

*Primary Examiner*—Hal D Wachsman
(74) *Attorney, Agent, or Firm*—Kris T. Fredrick

(57) ABSTRACT

A first frequency of electromagnetic radiation and a second frequency of electromagnetic radiation are received at a detector. The first and second frequencies of electromagnetic radiation are transmitted through a medium within a frequency range of approximately 0.1 TeraHertz to approximately 10 TeraHertz. Signals are generated that are proportional to the transmittance of the frequencies of electromagnetic radiation through the medium. A ratio of the of the signals is formed, and one or more of a relative humidity, an absolute humidity, and a water vapor concentration of the medium are calculated as a function of a temperature of the medium, the ratio, and a set of functional parameters associated with the temperature of the medium.

17 Claims, 13 Drawing Sheets

TERAHERTZ SENSOR TO MEASURE HUMIDITY AND WATER VAPOR

The current invention was developed in connection with funding from the Defense Intelligence Agency pursuant to CBRTA Agreement No. NMA401-02-9-2002. The U.S. Government has certain rights in this invention.

TECHNICAL FIELD

Various embodiments relate to the measurement of humidity and water vapor, and in an embodiment, but not by way of limitation, to the use of a TeraHertz sensor to measure humidity and water vapor.

BACKGROUND

The relative humidity of an environment depends primarily on water vapor concentration, temperature, and pressure. While a system could be constructed to measure all three in real time, such a system would be unduly complex, would require a database to store the relationship among all the variables, and would be susceptible to error.

DETAILED DESCRIPTION

Figure 1:
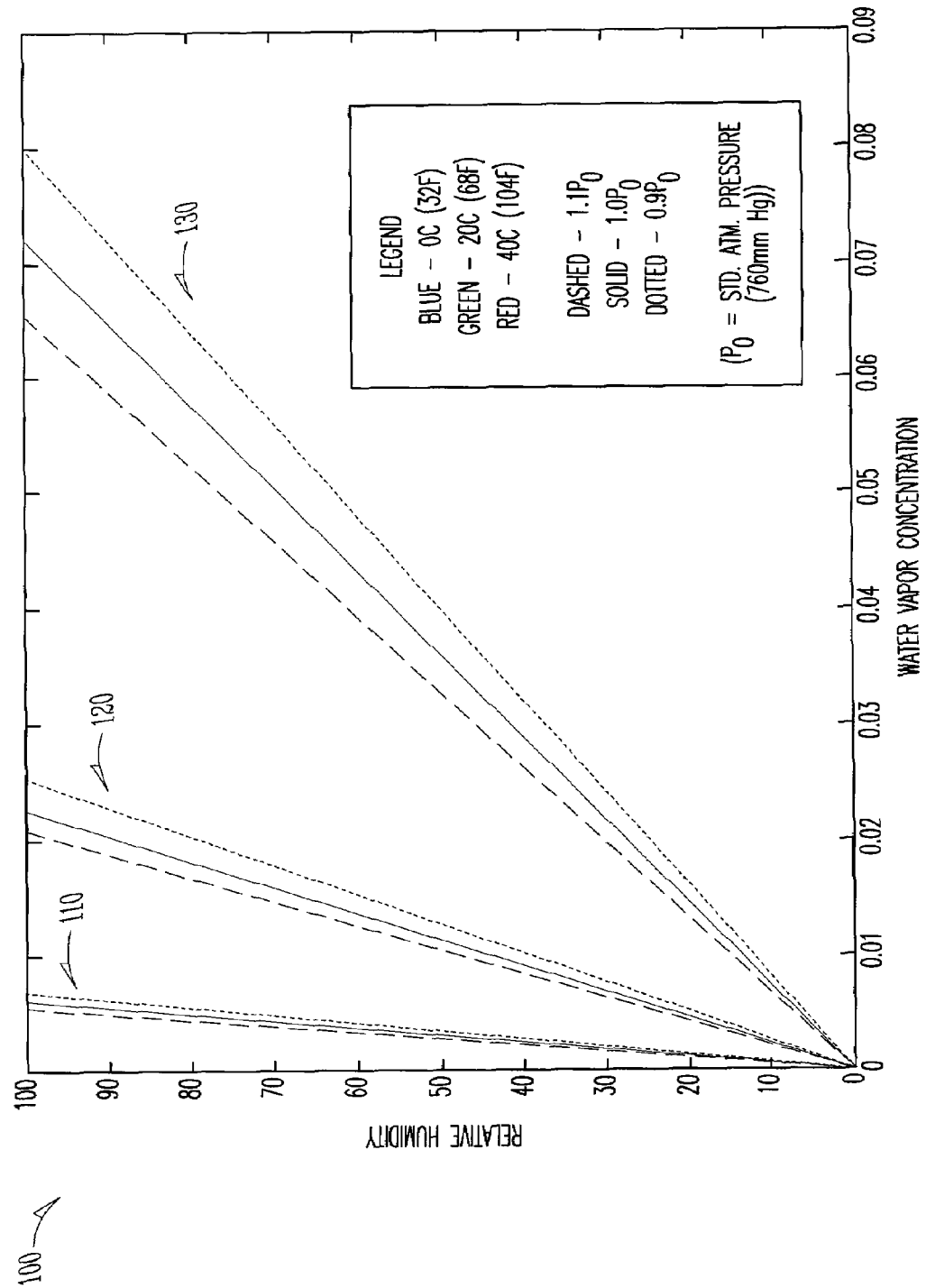
FIG. 1 is a graph of relative humidity versus water vapor concentration at different temperatures and pressures.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

FIG. 1 shows the variation of relative humidity as a function of atmospheric water vapor concentration (in per mil, or parts per thousand) for different values of atmospheric temperature and pressure. While an embodiment relating to relative humidity is discussed in relation to the Figures, a system and method calibrated for and determining the absolute humidity and/or water vapor concentration could also be used. The temperatures in FIG. 1 are 0° C. at 110, 20° C. at 120, and 40° C. at 130. Standard atmospheric temperature and pressure (STP) are 0° C. and 101325 Pa (760 mm Hg, 29.92 in Hg). The maximum deviations in atmospheric pressure ever recorded at sea level do not exceed 10% of the standard pressure, and thus values of pressure were chosen to be $0.9 P_0$, $P_0$, and $1.1 P_0$, where $P_0=760$ mmHg. Values of temperature ranged from freezing (0° C.) to room temperature (20° C.) to "hot" (40° C.). FIG. 1 illustrates that temperature has a much stronger effect on relative humidity than pressure. Thus, to first order, pressure dependence on relative humidity can be ignored. In an embodiment, this limitation can be overcome with the addition of a pressure sensor. In another embodiment, only a temperature sensor (and not a pressure sensor) is used and the error associated with pressure variations is evaluated based on measurements of TeraHertz (THz) signals in a water "transmittance window" and a water "absorption window".

Figure 10:
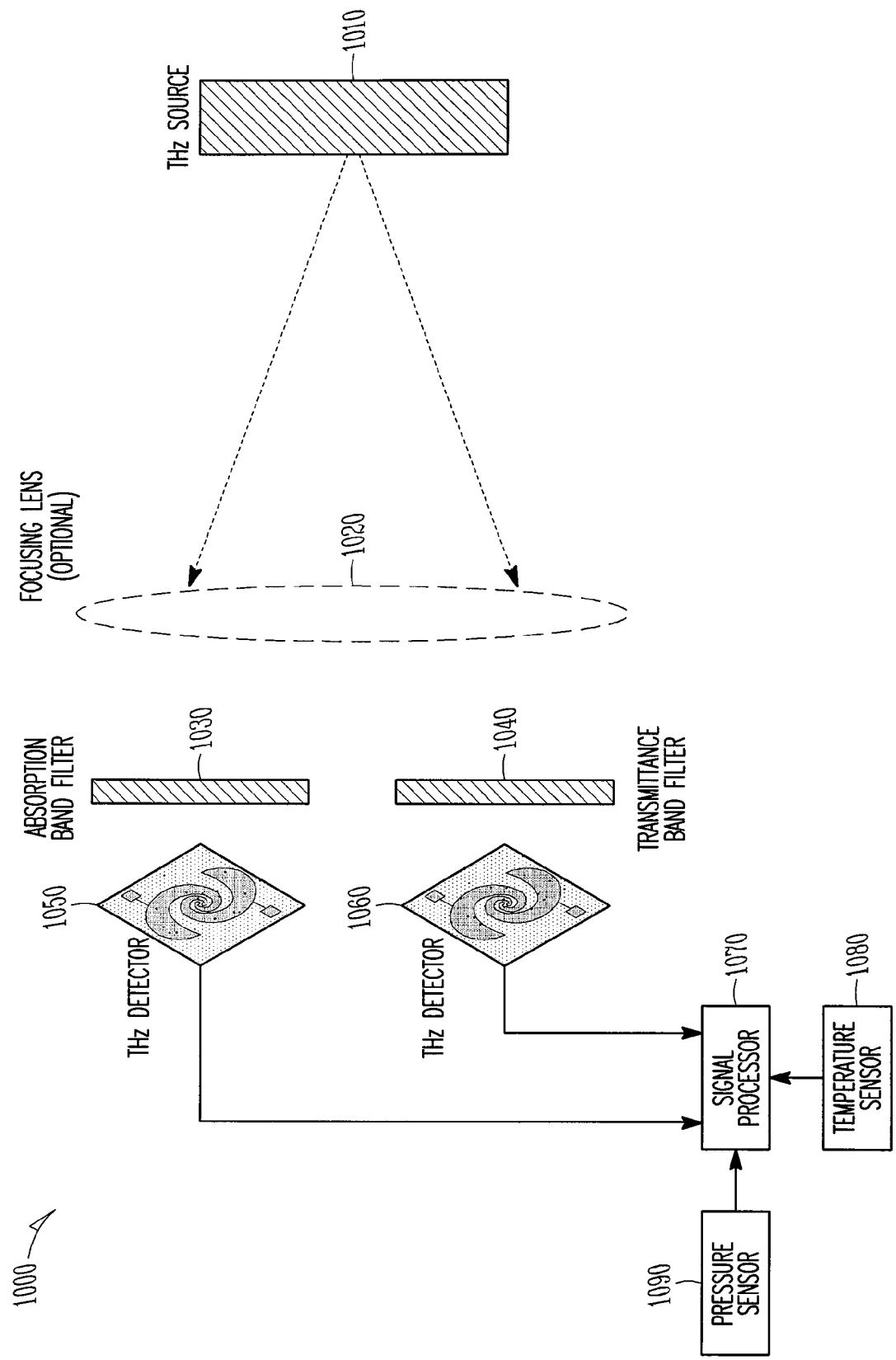
FIG. 10 is an illustration of a system configured to detect electromagnetic radiation in an absorption band and a transmittance band.

FIG. 10 illustrates a system 1000 that can be used to measure the relative humidity within a medium such as atmospheric air. The system 1000 includes a THz source 1010. The source 1010 can include a mercury lamp, a globar, a semiconductor laser, and an incandescent light bulb. The THz source 1010 is configured to transmit light through an optional focusing lens 1020, an absorption band filter 1030 and a transmittance band filter 1040, and onto one or more THz detectors 1050 and 1060. The THz detectors 1050 and 1060 are coupled to a signal processor 1070. A temperature sensor 1080 is coupled to the signal processor 1070. In an embodiment, a pressure sensor 1090 is coupled to the signal processor 1070. In an embodiment, the THz detectors 1050 and 1060 are configured with noise equivalent power (NEP) =10 pW sampled at 1 Hz. The two detectors 1050 and 1060 can be placed next to one another and have a 1000K miniature globar (blackbody) imaged on them from a distance of one meter. In an embodiment, the THz detectors 1050 and 1060 are sensitive from 0.5 THz to 3 THz [16.67-100 cm$^{-1}$]. Each detector can be fitted with a notch filter having 1 cm$^{-1}$ bandpass (~=1 μm bandpass in wavelength). Ignoring optical losses and assuming the optics images the globar on the two detectors 1050 and 1060, the radiant power on each detector 1050 and 1060 is given by the following expression:

$$P_{det} = \tau_o \tau_{atm} \frac{A_{det}}{4f/^2+1} H_{bb}$$

where $\tau_0$=optics transmission=1
$\tau_{atm}$=atmospheric transmission over 1 m
$A_{det}$=detector area
$H_{bb}$=black body in-band irradiance (watt/m$^2$).

Figure 2:
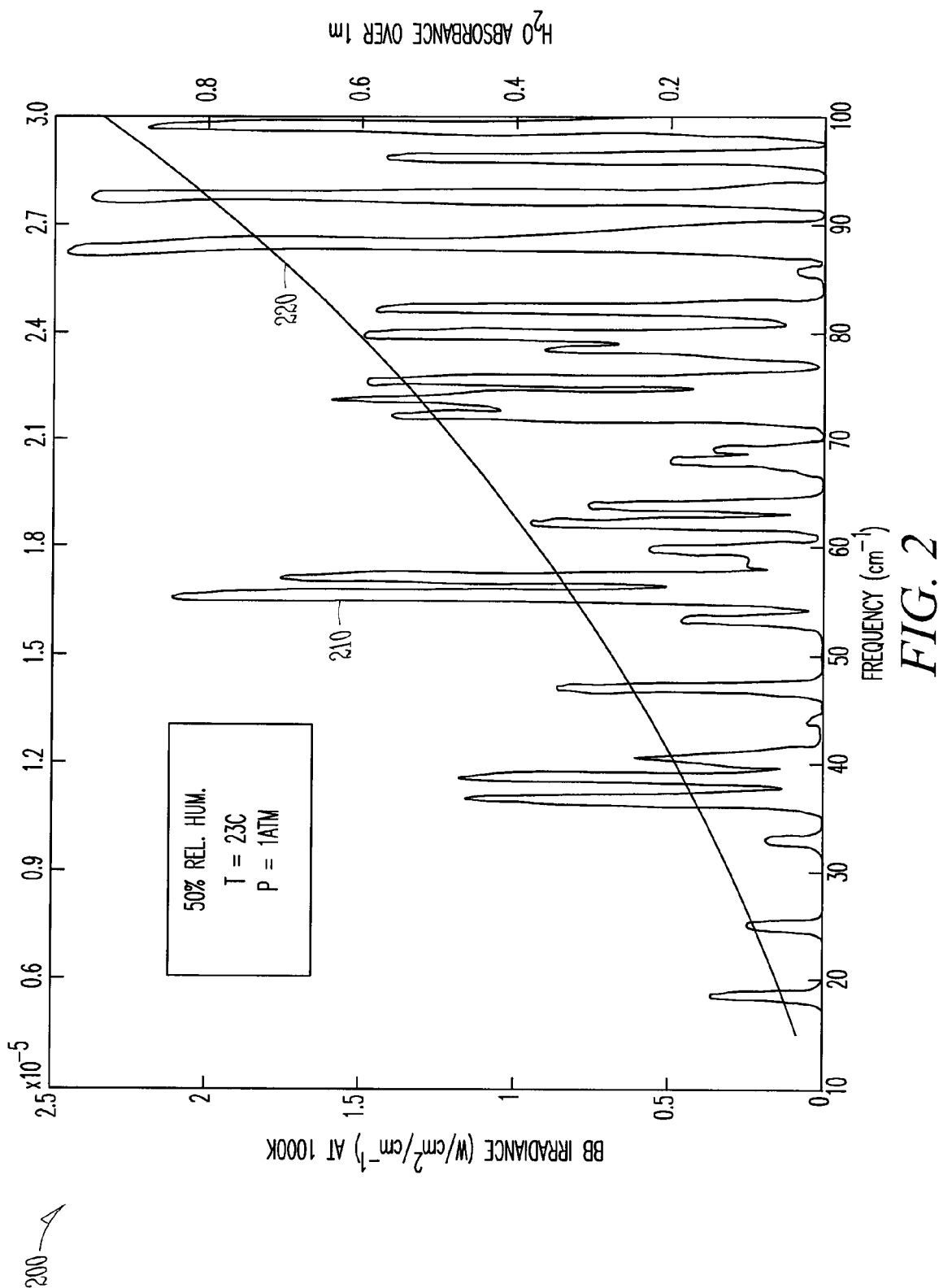
FIG. 2 is a graph of irradiance/absorption versus frequency.

FIG. 2 shows a spectral trace 200 from a spectral irradiance of a 1000K black body over the specified frequency range 220 and water vapor absorbance (=1–transmittance) over the 1 meter path 210. The absorbance is equal to 1–exp(–αd)), where d=1 meter and α is the absorption coefficient (m$^{-1}$). The water vapor absorbance in FIG. 2 data has been smoothed with a 1 cm$^{-1}$ window. As an example, in FIG. 2, a "transmittance window" is chosen to be the spectral band [83.4 to 86.5] cm$^{-1}$ and an "absorption window" is chosen to be the spectral band [87.0 to 90.2] cm$^{-1}$. Signals are generated in both the transmittance and absorption bands for the 1000K blackbody source and f/1 optics for varying relative humidity.

Figure 3:
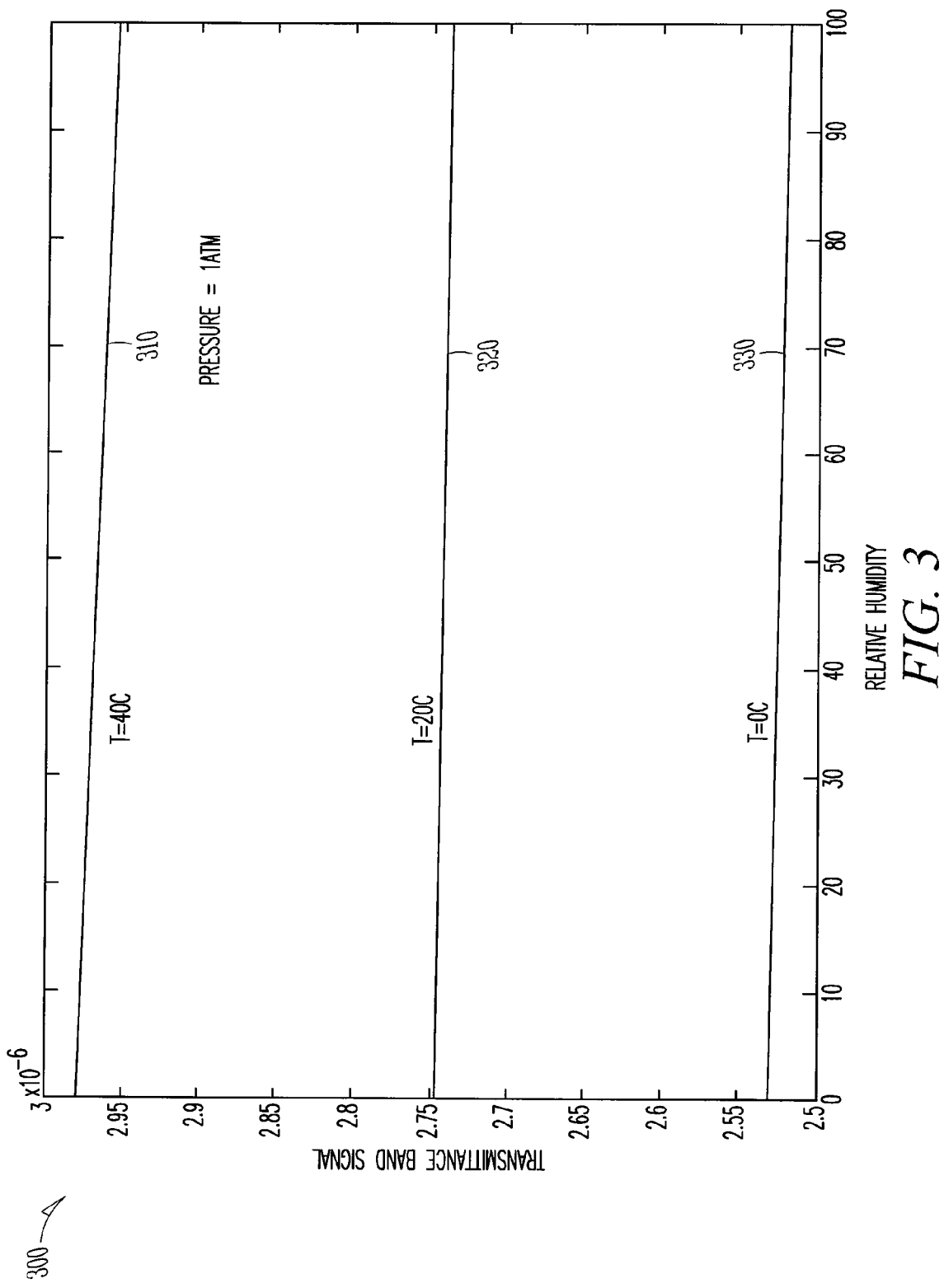
FIG. 3 is a graph of a transmittance band signal versus relative humidity at different temperatures.
Figure 4:
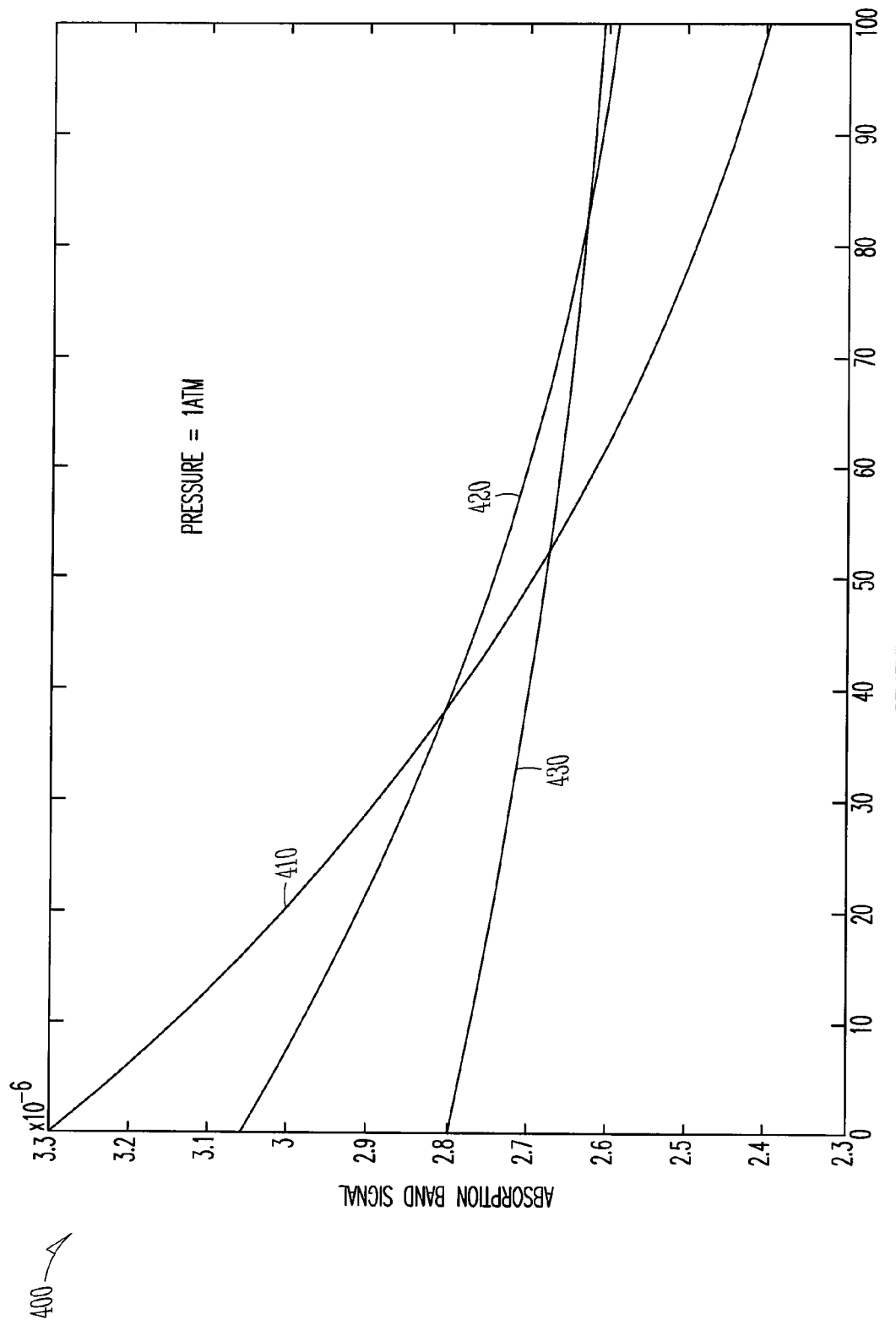
FIG. 4 is a graph of an absorption band signal versus relative humidity at different temperatures.
Figure 5:
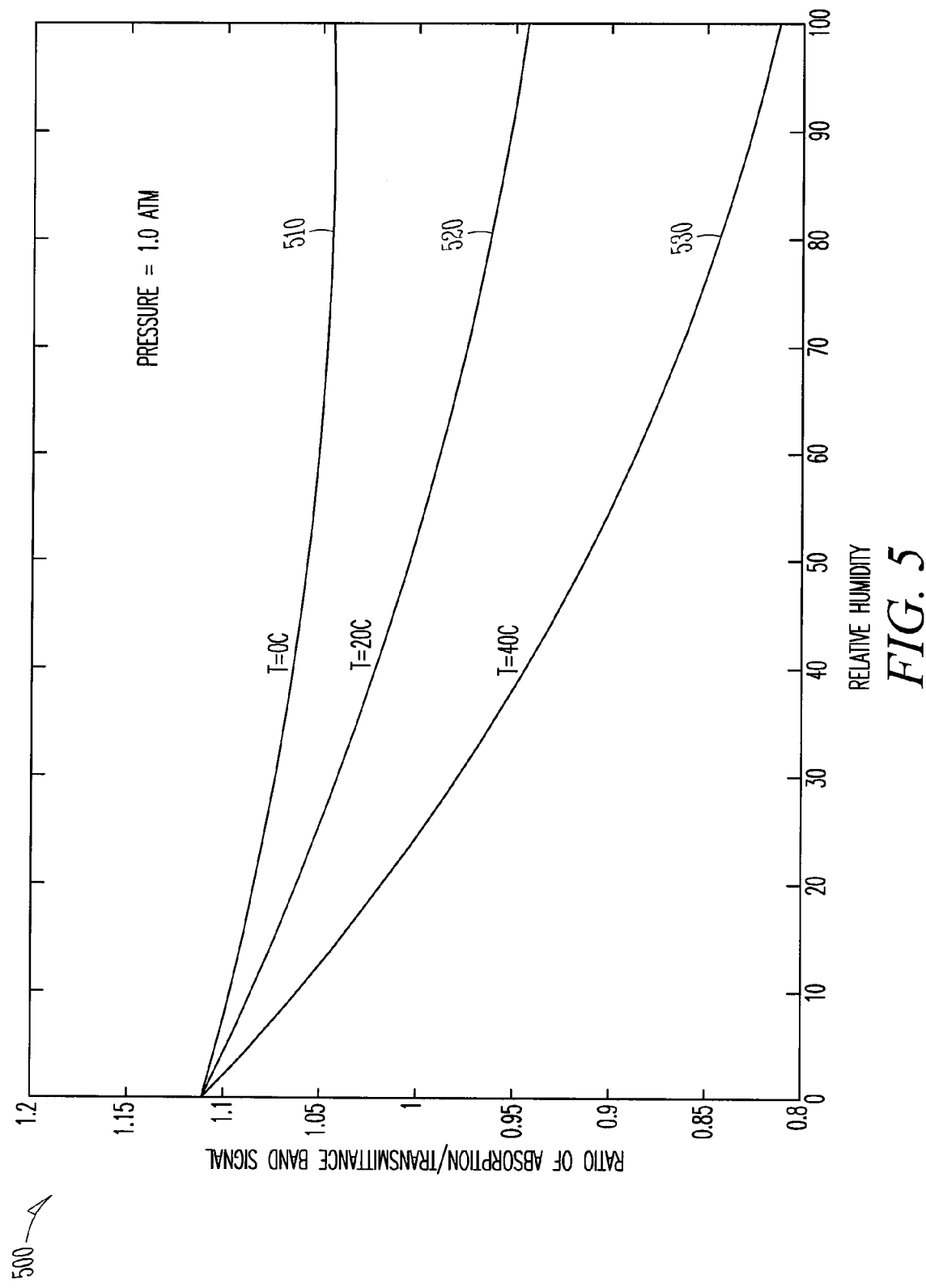
FIG. 5 is a graph of a ratio of an absorption/transmittance band signal versus relative humidity at different temperatures and at 1 atmosphere pressure.
Figure 6:
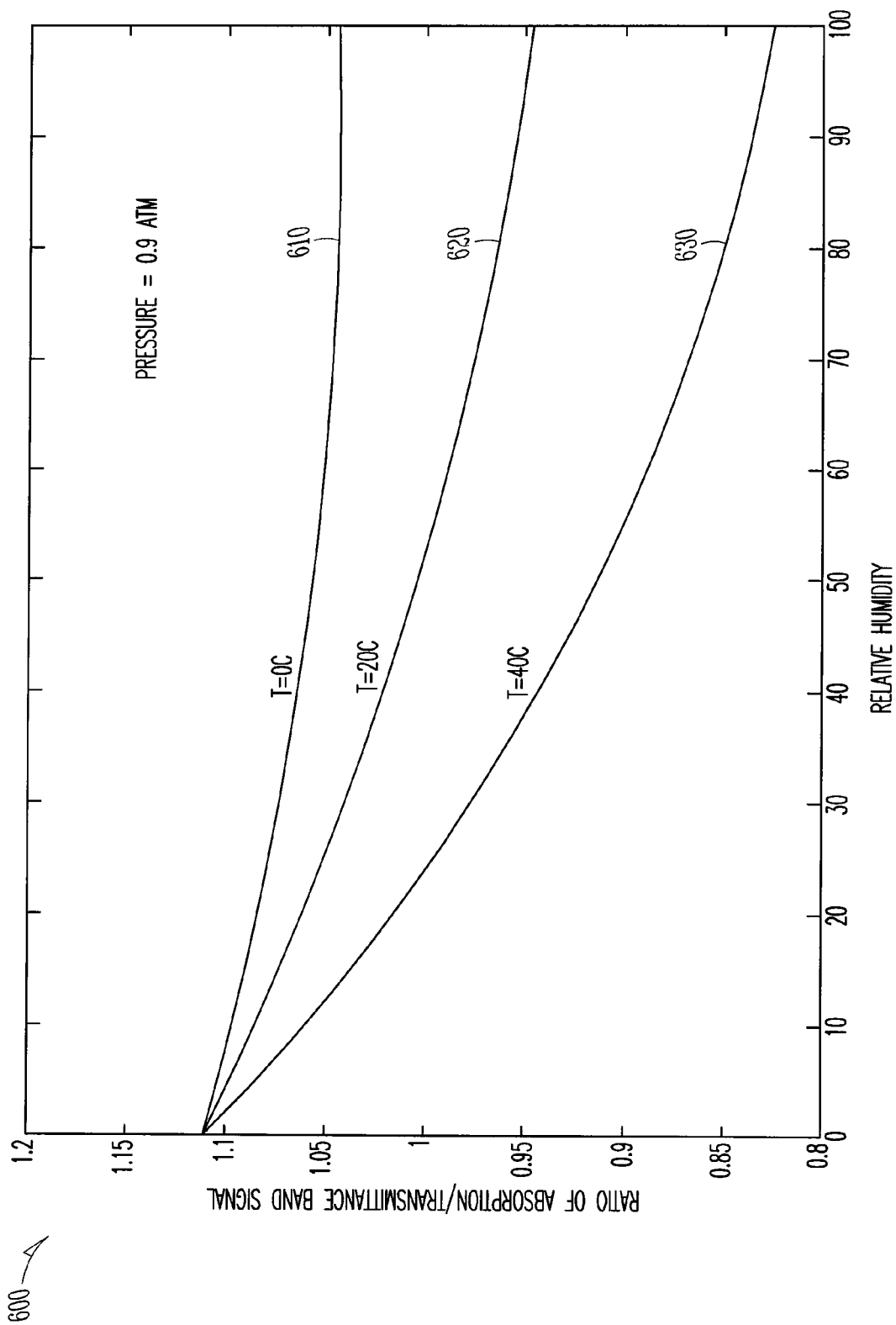
FIG. 6 is a graph of a ratio of an absorption/transmittance band signal versus relative humidity at different temperatures and at 0.9 atmosphere pressure.
Figure 7:
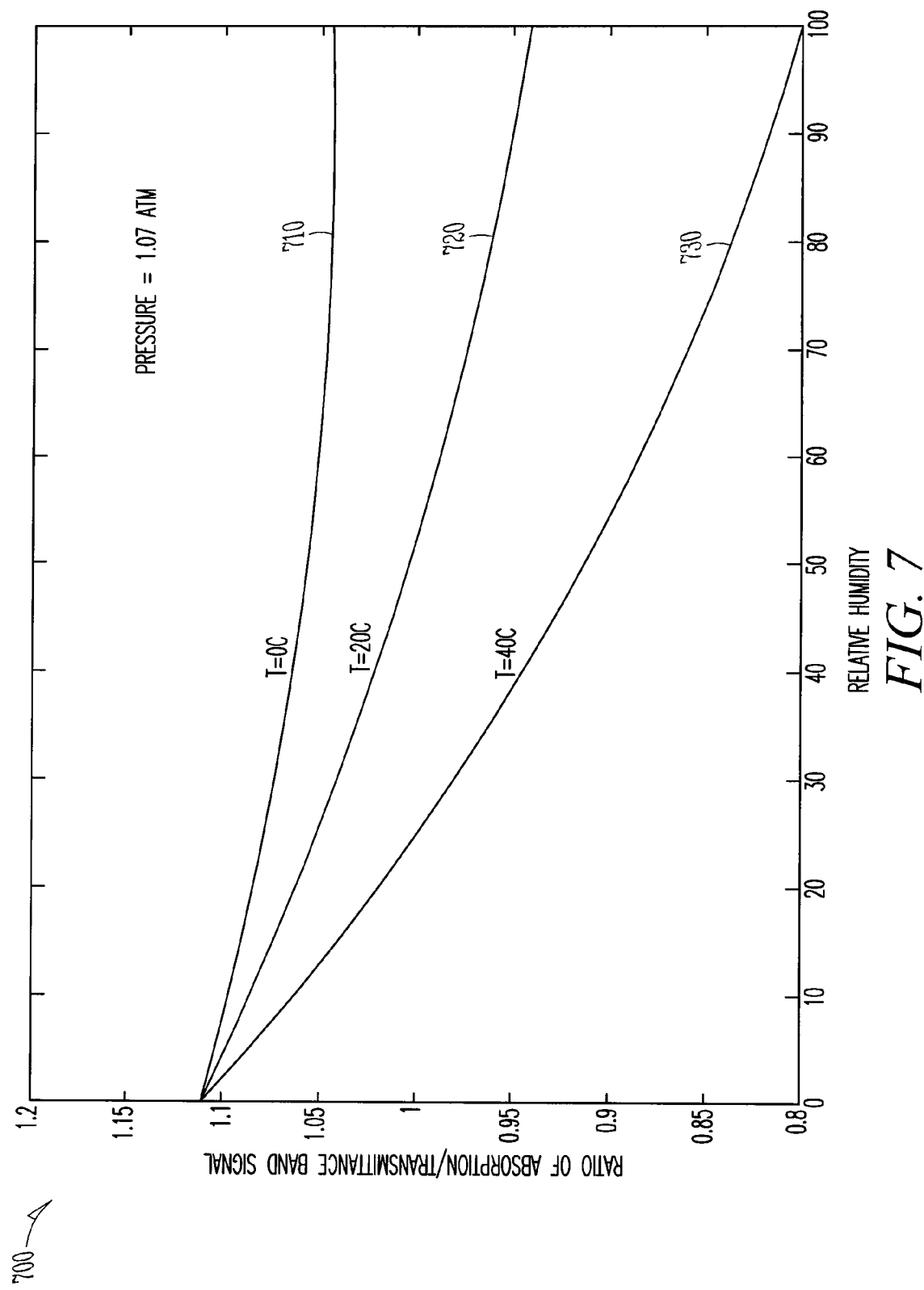
FIG. 7 is a graph of a ratio of an absorption/transmittance band signal versus relative humidity at different temperatures and at 1.07 atmosphere pressure.

FIG. 3 illustrates graph 300 with functions 310, 320, and 330 that in the transmittance band, detector signals are relatively independent of the relative humidity, and are mostly dependent on air temperature. In contrast, FIG. 4 illustrates graph 400 with functions 410, 420, and 430 that in the absorption band, the detector signals vary strongly with relative humidity and temperature. So, the transmittance band signal can be used to remove some of the temperature dependence by taking a ratio of the absorption/transmittance band signals. The result 500 at 1 atmosphere pressure is shown in FIG. 5 with functions 510, 520, and 530. FIG. 5 illustrates in particular that the curves 510, 520, and 530 coincide at 0% relative humidity have slopes that vary as a function of temperature. FIG. 6 illustrates the same phenomenon with graph 600 and curves 610, 620, and 630 for a pressure of 0.9 atmosphere. FIG. 7 illustrates the same phenomenon with graph 700 and curves 710, 720, and 730 at 1.07 atmospheres.

FIGS. 3, 4, 5, 6, and 7 show that the ratio of an absorption band signal to a transmittance band signal is essentially independent of pressure. Therefore, as a first approximation, least squares coefficients can be calculated to fit relative humidity to the ratio signal at 1 atmosphere pressure for each temperature, and then this fit can be applied to the remaining pressures to check the accuracy.

Figure 8:
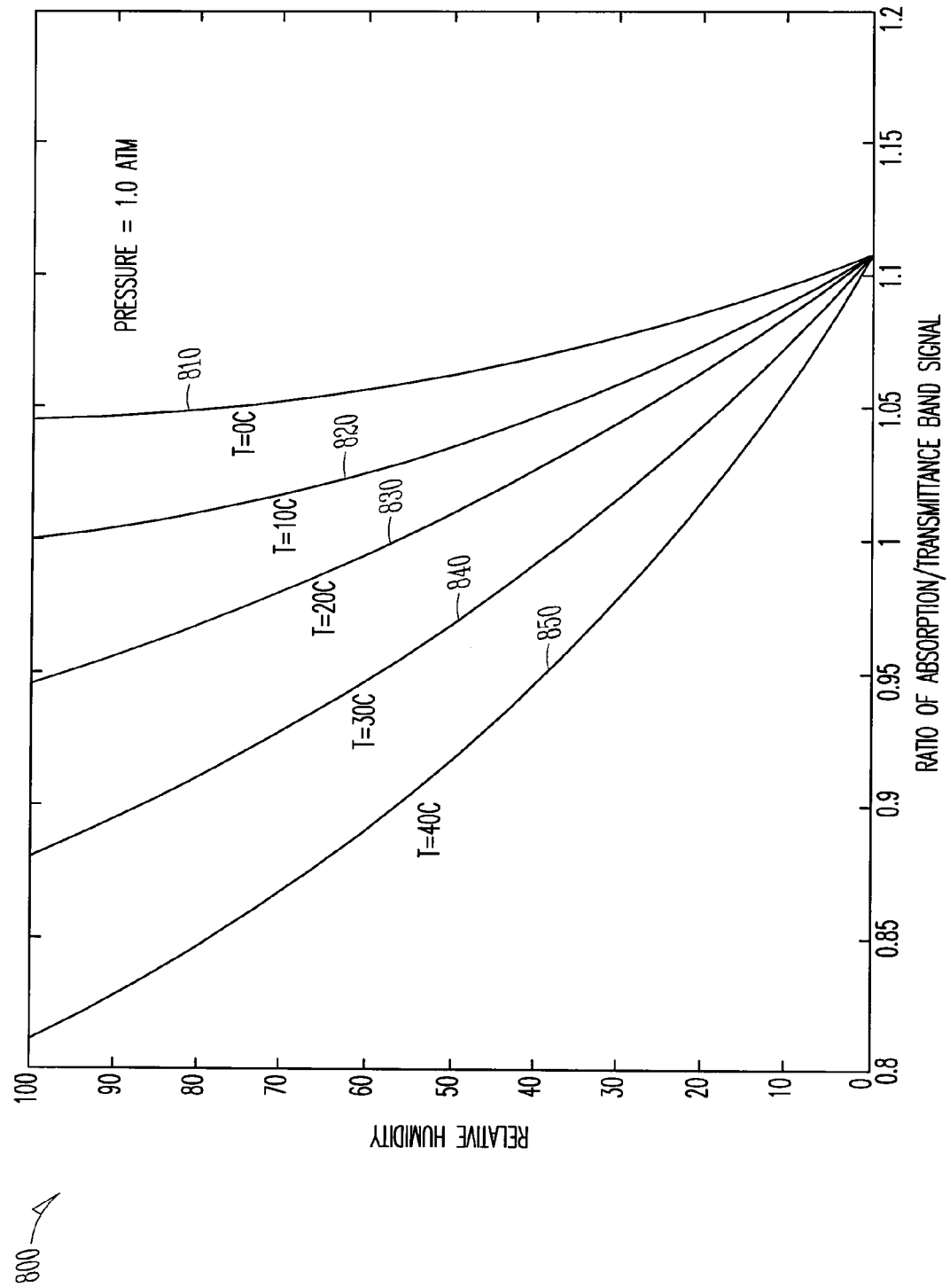
FIG. 8 is a graph of relative humidity versus a ratio of an absorption/transmittance band signal at different temperatures and at 1 atmosphere pressure.

The curves in FIG. 5 are inverted and the relative humidity versus the signal ratio is plotted for each temperature to get the new curves 810, 820, 830, 840, and 850 as shown the graph 800 in FIG. 8. In FIG. 8, two additional intermediate temperatures (820 and 840) are included to obtain a more accurate functional fit.

A separate least squares fit of a quadratic polynomial of relative humidity to the signal ratio is calculated for each temperature. In the example of FIG. 8, the coefficients for each temperature are:

$RH(s; 0C)=3228.0*s^2-8353.9*s+5297.2$ $RH(s; 10C)=2112.4*s^2-5334.3*s+3319.8$ $RH(s; 20C)=1493.3*s^2-3652.6*s+2216.1$ $RH(s; 30C)=1118.5*s^2-2643.4*s+1558.2$ $RH(s; 40C)=851.41*s^2-1955.1*s+1124$ wherein s is the ratio of the absorption band signal to the transmittance band signal.

If the temperature of the environment or medium happens to be one of the values in FIG. 8, then the coefficients will accurately determine the relative humidity given the ratio of the measured THz signals (in the absorption and transmittance bands). However, the calculation can be extended to any temperature by simply fitting the three sets of coefficients to temperature (one fit for the quadratic coefficients, one for the linear coefficients, and one fit for the constant coefficients)

Performing the fit each coefficient to a quadratic function of temperature in Kelvin (273.16+T[C]) generates the following:

$A2(T)=1/3737e+005-870.08*T+1.3867*T^2$ (1)

$A1(T)=-3.7616e+005+2388.0*T-3.8107*T^2$ (2)

$A0(T)=2.4841e+005-1579.5*T+2.5230*T^2$ (3)

Therefore, the algorithm to calculate relative humidity from the measured absorption band signal ($s_a$), the measured transmittance band signal ($s_t$), and the measured temperature T is as follows:

1. Express the temperature T in degrees Kelvin
2. Calculate the coefficients A0(T), A1(T), and A2(T) at temperature T using equations 1-3 above.
3. Form the ratio of the absorption band signal to the transmittance band signal, $s=s_a/s_t$ (4)

4. Calculate the relative humidity RH with the expression

Relative Humidity=$A0(T)+A1(T)*s+A2(T)*s^2$ (5)

Higher order polynomials, or even non-polynomial functions, can be used to improve the accuracy of the fitting functions and further include the effects of pressure, if pressure is measured by another means.

Figure 9:
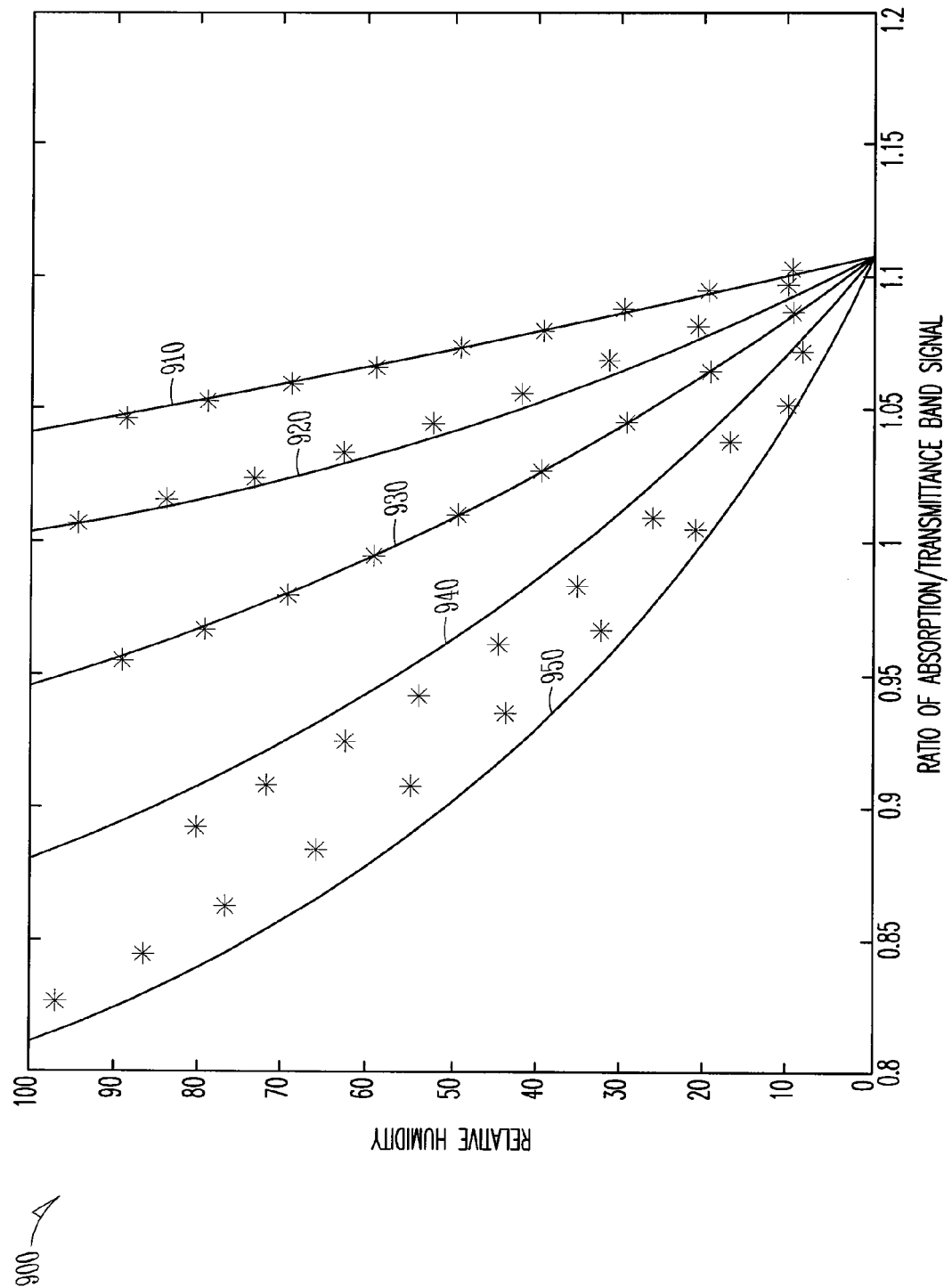
FIG. 9 is a graph of relative humidity versus a ratio of an absorption/transmittance band signal.

The accuracy of the above-identified approximation can be shown as follows. As a first case, a pressure of 1 atmosphere (760 mm Hg) and temperatures of 0° C., 10° C., 20° C., 30° C., and 40° C., and relative humidity values of 10, 20, 30, 40, 50, 60, 70, 80, and 90 percent are considered. The HITRAN (High-Resolution Transmission Molecular Absorption) database is used to calculate the exact values in a manner similar to what was done in FIGS. 1-5 above. Then, the estimated relative humidity is separately calculated at each temperature using equations (1)-(5) above and compared with the exact value. The results are shown in graph 900 of FIG. 9, where the solid lines 910, 920, 930, 940, and 950 are the exact values and the asterisks (*) are the estimated values.

As another example, the approximation can be refined by fitting the signal ratio versus the relative humidity to a cubic polynomial. In an example, this then provides:

$$RH(s; 0C) = -6977.5*s^3 + 25731*s^2 - 32540*s + 13960$$

$$RH(s; 10C) = -4487.6*s^3 + 16291*s^2 - 20259*s + 8553.1$$

$$RH(s; 20C) = -3000.9*s^3 + 10710*s^2 - 13075*s + 5422.8$$

$$RH(s; 30C) = -2043.4*s^3 + 7176.6*s^2 - 8613.8*s + 3514.1$$

$$RH(s; 40C) = -1379*s^3 + 4780.8*s^2 - 5668.8*s + 2288.3$$

Again, the coefficients are fitted to a quadratic in temperature, and Equations 1-3 are now replaced by the four expressions:

$$A3(T) = -2.9928e + 005 + 1886.1*T - 2.9858*T^2 \qquad (6)$$

$$A2(T) = 1.1496e + 006 - 7264.3*T + 11.526*T^2 \qquad (7)$$

$$A1(T) = -1.5165e + 006 + 9609.3*T - 15.282*T^2 \qquad (8)$$

$$A0(T) = 6.7626e + 005 - 4295.6*T + 6.846*T^2 \qquad (9)$$

Figure 11:
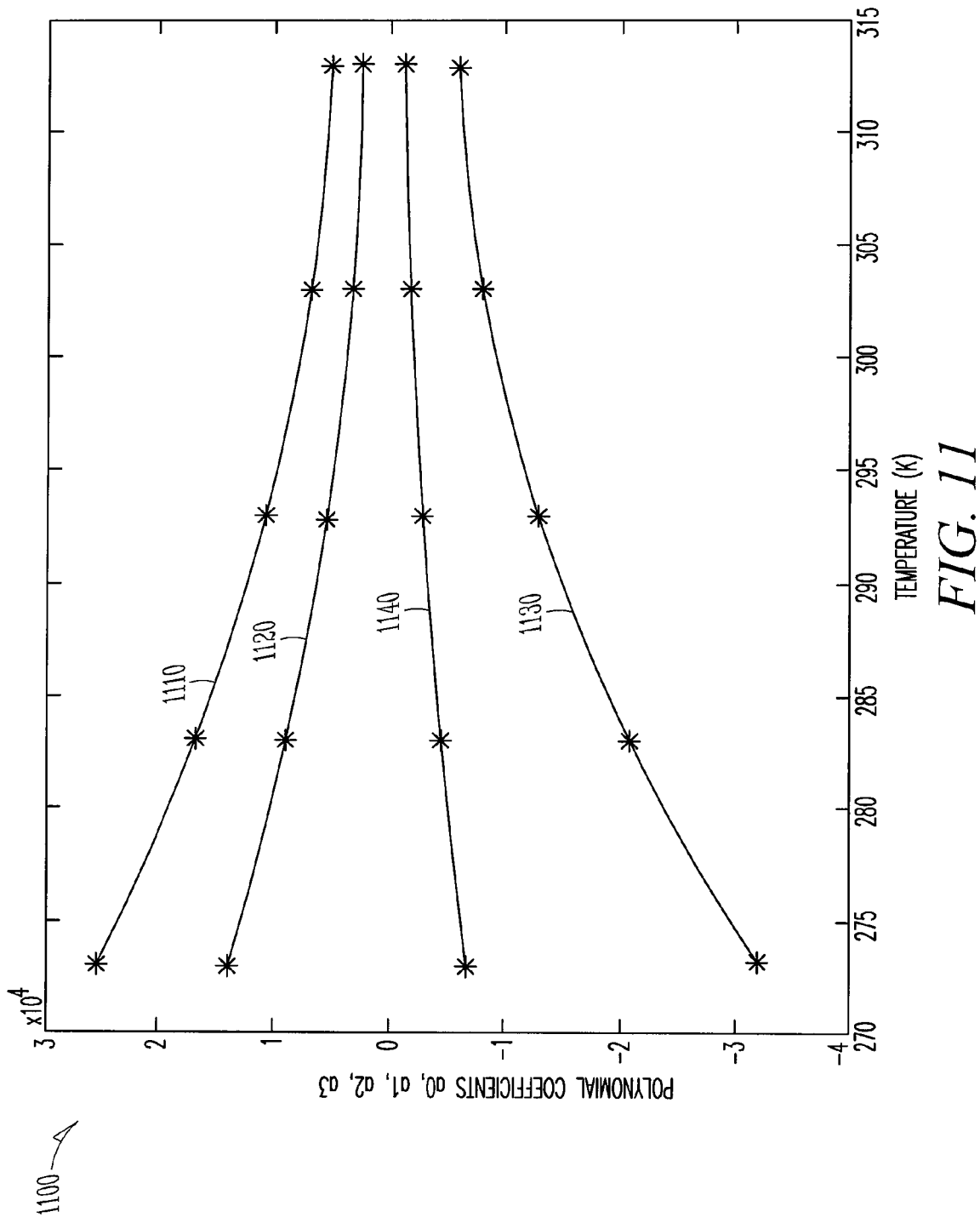
FIG. 11 is a graph of polynomial coefficients, from a plot of relative humidity versus ratio of an absorption/transmittance band signal, versus temperature.

The fit values (*) are compared to the actual coefficients in graph 1100 and curves 1110, 1120, 1130, and 1140 of FIG. 11.

Figure 12A:
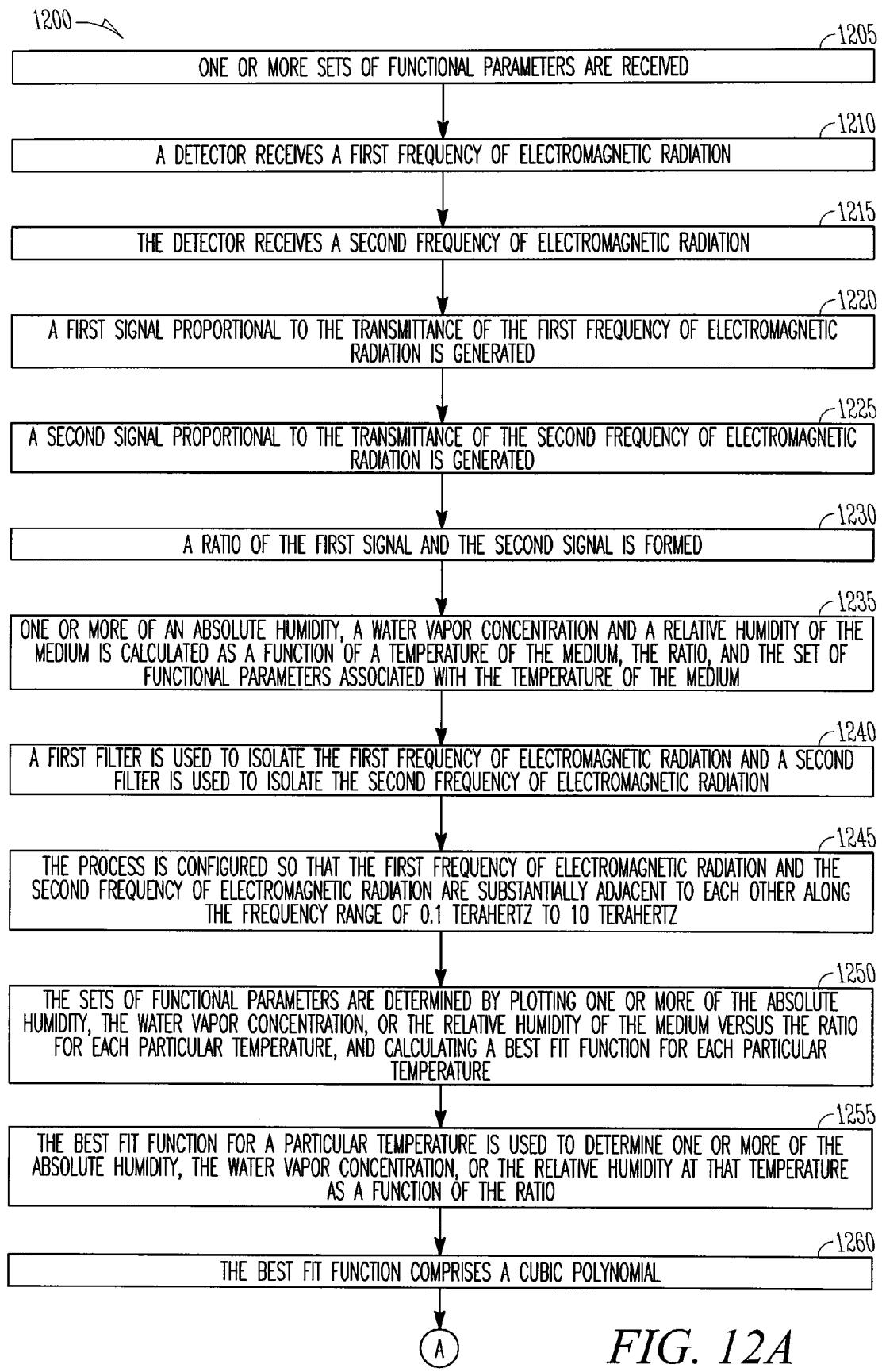
FIGS. 12A and 12B illustrate an example flowchart of a process to determine relative humidity.
Figure 12B:
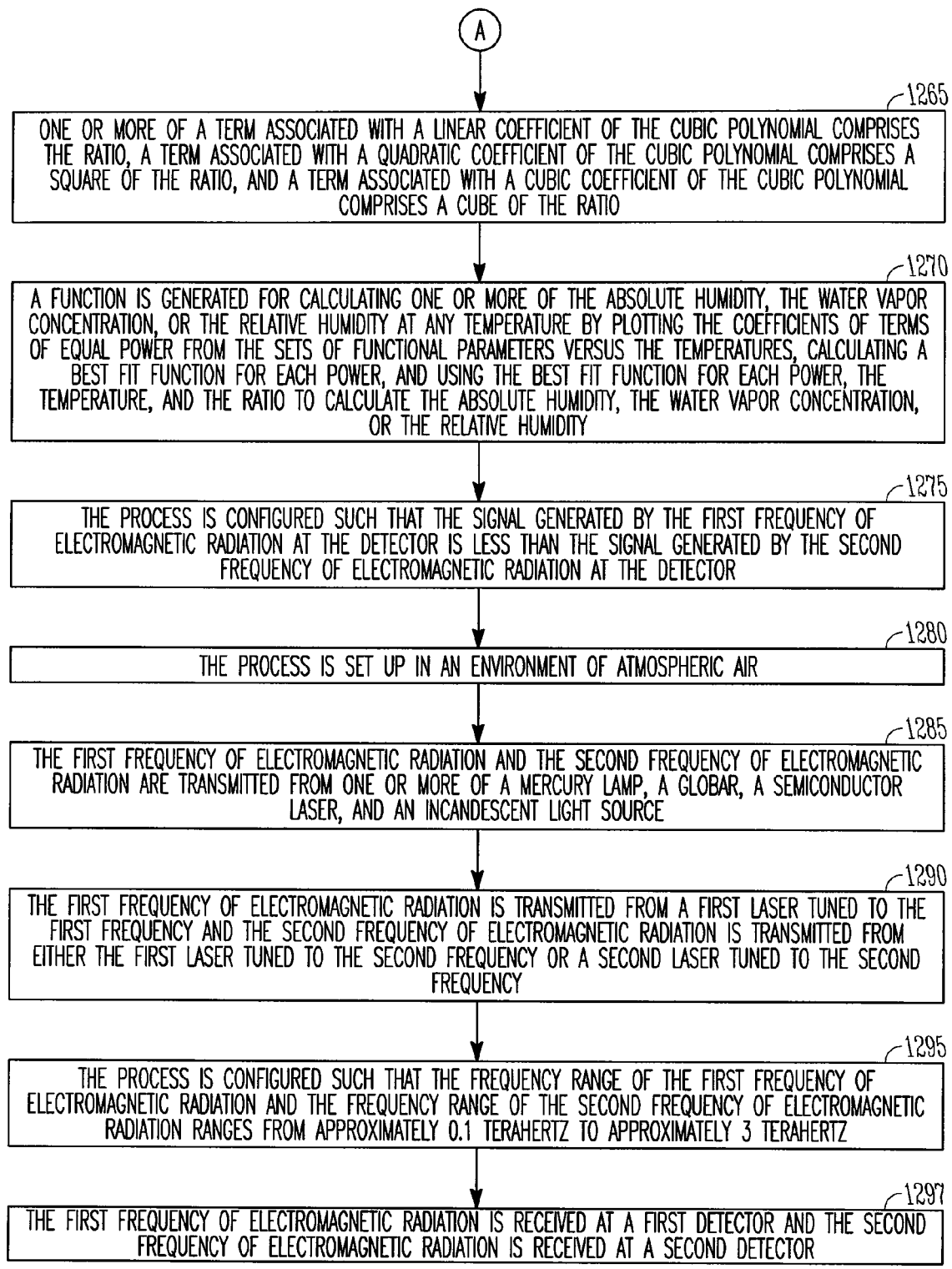

FIGS. 12A and 12B are a flowchart of an example process 1200 for determining a relative humidity of an environment. FIGS. 12A and 12B include a number of process blocks 1205-1297. Though arranged serially in the example of FIG. 12, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to process 1200 in FIGS. 12A and 12B, at 1205 one or more sets of functional parameters are received. In an embodiment, each set of functional parameters can be associated with a particular temperature. The functional parameters can be coefficients in a polynomial expression. At 1210, a detector receives a first frequency of electromagnetic radiation. The first frequency of electromagnetic radiation can be transmitted through a medium within a frequency range of approximately 0.1 TeraHertz to approximately 10 TeraHertz. At 1215, the detector receives a second frequency of electromagnetic radiation. The second frequency of electromagnetic radiation can be transmitted through the medium within a frequency range of approximately 0.1 TeraHertz to approximately 10 TeraHertz. At 1220, a first signal proportional to the transmittance of the first frequency of electromagnetic radiation is generated, and at 1225, a second signal proportional to the transmittance of the second frequency of electromagnetic radiation is generated. At 1230, a ratio of the first signal and the second signal is formed. At 1235, one or more of a relative humidity of the medium, an absolute humidity, and a water vapor concentration are calculated as a function of a temperature of the medium, the ratio, and the set of functional parameters associated with the temperature of the medium. At 1240, a first filter is used to isolate the first frequency of electromagnetic radiation and a second filter is used to isolate the second frequency of electromagnetic radiation. At 1245, the process is configured so that the first frequency of electromagnetic radiation and the second frequency of electromagnetic radiation are substantially adjacent to each other along the frequency range of 0.1 TeraHertz to 10 TeraHertz. At 1250, the sets of functional parameters are determined by plotting the relative humidity, the absolute humidity, or the water vapor concentration of the medium versus the ratio for each particular temperature, and calculating a best fit function for each particular temperature, thereby generating parameters for each term of the best fit function for each particular temperature. At 1255, the best fit function for a particular temperature is used to determine one or more of the relative humidity, the absolute humidity, and the water vapor concentration at that temperature as a function of the ratio. At 1260, the best fit function comprises a cubic polynomial. At 1265, one or more of a term associated with a linear coefficient of the cubic polynomial comprises the ratio, a term associated with a quadratic coefficient of the cubic polynomial comprises a square of the ratio, and a term associated with a cubic coefficient of the cubic polynomial comprises a cube of the ratio. At 1270, a function is generated for calculating one or more of the relative humidity, the absolute humidity, and the water vapor concentration at any temperature by plotting the coefficients of terms of equal power from the sets of functional parameters versus the temperatures, calculating a best fit function for each power, and using the best fit function for each power, the temperature, and the ratio to calculate the relative humidity. At 1275, the process is configured such that the signal generated by the first frequency of electromagnetic radiation at the detector is of lesser magnitude than the signal generated by the second frequency of electromagnetic radiation at the detector. This forms an absorption window at the first frequency and a transmittance window at the second frequency. At 1280, the process is set up in an environment of atmospheric air. At 1285, the first frequency of electromagnetic radiation and the second frequency of electromagnetic radiation are transmitted from one or more of a mercury lamp, a globar, a semiconductor laser, and an incandescent light source. At 1290, the first frequency of electromagnetic radiation is transmitted from a first laser tuned to the first frequency and the second frequency of electromagnetic radiation is transmitted from either the first laser tuned to the second frequency or a second laser tuned to the second frequency. At 1295, the process is configured such that the frequency range of the first frequency of electromagnetic radiation and the frequency range of the second frequency of electromagnetic radiation ranges from approximately 0.1 TeraHertz to approximately 3 TeraHertz. At 1297, the first frequency of electromagnetic radiation is received at a first detector and the second frequency of electromagnetic radiation is received at a second detector.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment.

The invention claimed is:

1. A process to calculate a relative humidity, an absolute humidity, or a water vapor concentration, the process comprising:
   receiving at a detector a first frequency of electromagnetic radiation, the first frequency of electromagnetic radiation transmitted through a medium within a frequency range of approximately 0.1 TeraHertz to approximately 10 TeraHertz;
   receiving at the detector a second frequency of electromagnetic radiation, the second frequency of electromagnetic radiation transmitted through the medium within a frequency range of approximately 0.1 TeraHertz to approximately 10 TeraHertz;
   generating a first signal at the detector, the first signal proportional to a transmittance of the first frequency of electromagnetic radiation through the medium;
   generating a second signal at the detector, the second signal proportional to a transmittance of the second frequency of electromagnetic radiation through the medium;
   forming a ratio of the first signal and the second signal;
   determining one or more sets of parameters by:
      plotting relative humidity of the medium, absolute humidity of the medium, or water vapor concentration of the medium versus the ratio for a plurality of temperatures; and
      calculating a best fit function for each plurality of temperatures, thereby generating a parameter for each term of the best fit function for each of the plurality of temperatures; and
   using the best fit function or a lookup table at a particular temperature to determine one or more of the relative humidity, the absolute humidity, and the water vapor concentration at the particular temperature.

2. The process of claim 1, further comprising using a first filter to isolate the first frequency of electromagnetic radiation and using a second filter to isolate the second frequency of electromagnetic radiation.

3. The process of claim 1, wherein the first frequency of electromagnetic radiation and the second frequency of electromagnetic radiation are substantially adjacent to each other along the frequency range of 0.1 TeraHertz to 10 TeraHertz.

4. The process of claim 1, wherein the best fit function comprises a cubic polynomial, and further wherein one or more of a term associated with a linear coefficient of the cubic polynomial comprises the ratio, a term associated with a quadratic coefficient of the cubic polynomial comprises a square of the ratio, and a term associated with a cubic coefficient of the cubic polynomial comprises a cube of the ratio.

5. The process of claim 1 further comprising generating a function for calculating one or more of the relative humidity, the absolute humidity, and the water vapor concentration at any temperature by:
   plotting the coefficients of terms of equal power from the one or more sets of parameters versus the temperatures;
   calculating a best fit function for each power; and
   using the best fit function for each power, the temperature, and the ratio to calculate one or more of the relative humidity, the absolute humidity, and the water vapor concentration.

6. The process of claim 1, wherein the signal generated by the first frequency of electromagnetic radiation at the detector is of lesser magnitude than the signal generated by the second frequency of electromagnetic radiation at the detector, so that the first frequency forms an absorption window and the second frequency forms a transmittance window.

7. The process of claim 1, wherein the medium is atmospheric air.

8. The process of claim 1, further comprising transmitting the first frequency of electromagnetic radiation and the second frequency of electromagnetic radiation from one or more of a mercury lamp, a globar, a semiconductor laser, and an incandescent light source.

9. The process of claim 1, further comprising transmitting the first frequency of electromagnetic radiation from a first laser tuned to the first frequency and transmitting the second frequency of electromagnetic radiation from either the first laser tuned to the second frequency or a second laser tuned to the second frequency.

10. The process of claim 1, wherein the frequency range of the first frequency of electromagnetic radiation and the frequency range of the second frequency of electromagnetic radiation ranges from approximately 0.1 TeraHertz to approximately 3 TeraHertz.

11. The process of claim 1, further comprising receiving the first frequency of electromagnetic radiation at a first detector and receiving the second frequency of electromagnetic radiation at a second detector.

12. An apparatus for calculating a relative humidity, an absolute humidity, or a water vapor concentration, the apparatus comprising:
   a source of electromagnetic radiation, configured to transmit the electromagnetic radiation through a medium that includes water vapor, the electromagnetic radiation comprising a frequency ranging from approximately 0.1 TeraHertz to approximately 10 TeraHertz;
   a detector configured to receive the electromagnetic radiation; and
   a processor configured to:
      generate a first signal at the detector, the first signal proportional to a transmittance of a first frequency of electromagnetic radiation through the medium;
      generate a second signal at the detector, the second signal proportional to a transmittance of a second frequency of electromagnetic radiation through the medium;
      form a ratio of the first signal and the second signal;
      determine one or more sets of parameters by:
         plotting relative humidity of the medium, absolute humidity of the medium, or water vapor concentration of the medium versus the ratio for a plurality of temperatures; and
         calculating a best fit function for each plurality of temperatures, thereby generating a parameter for each term of the best fit function for each of the plurality of temperatures; and
      use the best fit function or a lookup table at a particular temperature to determine one or more of the relative humidity, the absolute humidity, and the water vapor concentration at the particular temperature.

13. The apparatus of claim 12, wherein the source of electromagnetic radiation comprises one or more of a mercury lamp, a globar, a semiconductor laser, and an incandescent light bulb.

14. The apparatus of claim 12, wherein the detector comprises a thermocouple.

15. The apparatus of claim 12, further comprising a first filter and a second filter, the first filter and the second filter positioned between the source of electromagnetic radiation and the detector, the first filter configured to isolate the first frequency of the electromagnetic radiation, and the second filter configured to isolate the second frequency of the electromagnetic radiation.

16. The apparatus of claim 12, wherein the apparatus is configured such that the signal generated by the first frequency of electromagnetic radiation at the detector is of lesser magnitude than the signal generated by the second frequency of electromagnetic radiation at the detector.

17. The apparatus of claim 12, further comprising a pressure sensor coupled to the processor, and wherein the medium is atmospheric air.

* * * * *